United States Patent
Gu et al.

(10) Patent No.: US 11,169,847 B1
(45) Date of Patent: Nov. 9, 2021

(54) METHOD AND DEVICE FOR PROCESSING DISTRIBUTED DATA SOLVING PROBLEM OF MANUAL INTERVENTION BY DATA ANALYSTS

(71) Applicant: Shanghai IceKredit, Inc., Shanghai (CN)

(72) Inventors: Lingyun Gu, Shanghai (CN); Zhipan Guo, Shanghai (CN); Wei Wang, Shanghai (CN); Jianye Liu, Shanghai (CN)

(73) Assignee: Shanghai IceKredit, Inc., Shanghai (CN)

( * ) Notice: Subject to any disclaimer, the term of this patent is extended or adjusted under 35 U.S.C. 154(b) by 0 days.

(21) Appl. No.: 17/228,977

(22) Filed: Apr. 13, 2021

(30) Foreign Application Priority Data

May 29, 2020 (CN) .......................... 202010471369.6

(51) Int. Cl.
*G06F 9/46* (2006.01)
*G06F 9/48* (2006.01)
*H04L 29/08* (2006.01)

(52) U.S. Cl.
CPC ............ *G06F 9/4881* (2013.01); *H04L 67/10* (2013.01)

(58) Field of Classification Search
CPC ................................ G06F 9/4881; H04L 67/10
See application file for complete search history.

(56) References Cited

U.S. PATENT DOCUMENTS

| | | | |
|---|---|---|---|
| 7,818,313 B1* | 10/2010 | Tsimelzon | G06F 16/2471 707/718 |
| 9,686,086 B1* | 6/2017 | Nguyen | H04L 67/141 |
| 2017/0052831 A1 | 2/2017 | Wu et al. | |
| 2020/0125891 A1 | 4/2020 | Andrabi et al. | |

FOREIGN PATENT DOCUMENTS

| | | |
|---|---|---|
| CN | 102663543 A | 9/2012 |
| CN | 104462579 A | 3/2015 |
| CN | 110134729 A | 8/2019 |

OTHER PUBLICATIONS

First Office Action in counterpart Chinese Patent Application No. 202010471369.6, dated Jul. 13, 2020.
Second Office Action in counterpart Chinese Patent Application No. 202010471369.6, dated Jul. 22, 2020.

* cited by examiner

*Primary Examiner* — Wissam Rashid
(74) *Attorney, Agent, or Firm* — Westbridge IP LLC

(57) ABSTRACT

Disclosed are a method and a device for processing distributed data. The method includes: integrating and configuring data analysis services of multiple users with different data analysis requirements into a distributed computing engine program to obtain an analysis service data package; configuring a distributed scheduler in the cluster server according to the analysis service data package, and calling the distributed scheduler to monitor a message content transmitted by a message middleware including multiple data analysis services to be executed; and generating a distributed data execution plan according to the message content, and performing distributed scheduling calculation on the distributed data execution plan to obtain a distributed calculation result.

6 Claims, 4 Drawing Sheets

METHOD AND DEVICE FOR PROCESSING DISTRIBUTED DATA SOLVING PROBLEM OF MANUAL INTERVENTION BY DATA ANALYSTS

CROSS-REFERENCE TO RELATED APPLICATIONS

This application claims priority to Chinese Application No. 202010471369.6, filed on May 29, 2020, the entire disclosure of which is incorporated herein by reference.

TECHNICAL FIELD

The present disclosure relates to the technical field of distributed computing, in particular to a method and a device for processing distributed data.

BACKGROUND

Nowadays, data analysis services are getting more and more attention from enterprises, especially when combined with big data, data analysis becomes very important in the daily operations of enterprises.

In the field of traditional data analysis, there are many links in data analysis services, resulting in the inability to automatically transfer data analysis results between various products and services, requiring manual intervention by data analysts. Once the business scale of enterprise expands and the complexity of the business deepens, the way of manually analyzing and transferring data becomes very inefficient and extremely error-prone.

SUMMARY

Based on the shortcomings of the existing design, the present disclosure provides a method and a device for processing distributed data. By integrating and configuring the data analysis services of multiple users with different data analysis requirements into the distributed computing engine program, subsequent data analysis services can be automatically executed without submitting data analysis services separately, without manual intervention by data analysts, reducing business complexity, thereby improving data analysis efficiency and reducing data analysis service execution errors.

According to a first aspect of the embodiment of the present disclosure, a method for processing distributed data is provided, which is applied to a cluster server communicating with a distributed computing cluster, including the following operations:

integrating and configuring data analysis services of multiple users with different data analysis requirements into a distributed computing engine program to obtain an analysis service data package, wherein different data analysis services are distinguished by different class files in the analysis service data package;

configuring a distributed scheduler in the cluster server according to the analysis service data package, and calling the distributed scheduler to monitor a message content transmitted by a message middleware including multiple data analysis services to be executed; and generating a distributed data execution plan according to the message content, and performing distributed scheduling calculation on the distributed data execution plan to obtain a distributed calculation result.

In a possible implementation of the first aspect, the operation of integrating and configuring data analysis services of multiple users with different data analysis requirements into a distributed computing engine program to obtain an analysis service data package includes:

defining each data analysis service as an interface service in the distributed computing engine, configuring a calculation logic corresponding to each interface service, and configuring a matrix data table returned by the calculation result of each interface service; and integrating and configuring each interface service according to each matrix data table to obtain the analysis service data package through the distributed computing engine.

In a possible implementation of the first aspect, the operation of generating a distributed data execution plan according to the message content includes:

when monitoring the message content transmitted by the message middleware, storing the message content and a transmission timestamp corresponding to the message content in a preset database, and setting an execution state of the message content to an unexecuted state;

scanning the preset database every preset time interval, when it is found that there is a message content whose execution status is not executed in the preset database, and there is no execution program whose execution status is executing, sorting each message content in order of the transmission timestamp of the message content whose execution status is not executed, and generating a message content sorting list;

respectively generating a distributed data execution plan for each message content according to the order of each message content in the message content sorting list; and when execution of the distributed data execution plan corresponding to any message content is completed, setting the execution state of the message content to show the message content is executed.

In a possible implementation of the first aspect, the operation of performing distributed scheduling calculation on the distributed data execution plan to obtain a distributed calculation result includes:

parsing plan information of the distributed data execution plan, the plan information including a data analysis service list, an analysis service type, and a task plan identifier corresponding to each data analysis service in the data analysis service list;

starting a first thread and a second thread according to the plan information, the first thread being for starting a target distributed computing engine program corresponding to the analysis service type, and obtaining a return status code of the target distributed computing engine program, the second thread being for obtaining log information of the target distributed computing engine program;

transmitting the data analysis service list into the target distributed computing engine program after starting the target distributed computing engine program corresponding to the analysis service type; and loading data to be calculated corresponding to the task plan identifier from a predefined data source table, executing the data analysis service of the transmitted data analysis service list through the target distributed computing engine program, and performing the distributed scheduling calculation on the data to be calculated to obtain the distributed computing result.

In a possible implementation of the first aspect, the operation of executing the data analysis service of the transmitted data analysis service list through the target distributed computing engine program, and performing the distributed scheduling calculation on the data to be calculated to obtain the distributed computing result includes:

when the analysis service type is a retrospective analysis service type, searching whether there are target data analysis services in the data analysis service list that depend on other data analysis services through the target distributed computing engine program, wherein the other data analysis services do not exist in the data analysis service list;

when there are target data analysis services in the data analysis service list that depend on the other data analysis services, adding the other data analysis services to the data analysis service list; and sorting the data analysis service list according to order of each message content in the pre-defined message content sorting list, and executing each data analysis service in the data analysis service list according to the sorting result, respectively scheduling the data to be calculated corresponding to each data analysis service to each computing node in the distributed computing cluster to execute the corresponding distributed computing task, to obtain the distributed computing result.

In a possible implementation of the first aspect, the operation of executing the data analysis service of the transmitted data analysis service list through the target distributed computing engine program, and performing the distributed scheduling calculation on the data to be calculated to obtain the distributed computing result includes:

when the analysis service type is a cache collision service type, traversing each data analysis service that needs to be cached in the data analysis service list through the target distributed computing engine program; and obtaining, according to the data analysis service, from a pre-defined cache table, collision cache data that belong to the data analysis service and are associated and matched with the data to be calculated, using the collision cache data corresponding to all data analysis services as the distributed calculation result.

In a possible implementation of the first aspect, the operation of executing the data analysis service of the transmitted data analysis service list through the target distributed computing engine program, and performing the distributed scheduling calculation on the data to be calculated to obtain the distributed computing result includes:

when the analysis service type is a script scoring service type, obtaining a scoring script corresponding to each data analysis service in the data analysis service list and all external files that the scoring script depends on through the target distributed computing engine program; and traversing the data to be calculated, calling the scoring script and all external files that the scoring script depends on to calculate the data to be calculated, to obtain the distributed calculation result.

According to a second aspect of the embodiment of the present disclosure, a device for processing distributed data is provided, which is applied to a cluster server communicating with a distributed computing cluster, including:

an integration and configuration module for integrating and configuring data analysis services of multiple users with different data analysis requirements into a distributed computing engine program to obtain an analysis service data package, wherein different data analysis services are distinguished by different class files in the analysis service data package;

a monitor module for configuring a distributed scheduler in the cluster server according to the analysis service data package, and calling the distributed scheduler to monitor a message content transmitted by a message middleware including multiple data analysis services to be executed; and a scheduling calculation module for generating a distributed data execution plan according to the message content, and performing distributed scheduling calculation on the distributed data execution plan to obtain a distributed calculation result.

Based on any of the above aspects, in the present disclosure, the data analysis services of multiple users with different data analysis requirements are integrated and configured into the distributed computing engine program, a distributed scheduler in the cluster server is configured according to the analysis service data package, and the distributed scheduler is called to monitor the message content transmitted by the message middleware including multiple data analysis services to be executed. As a result, a distributed data execution plan can be generated according to the content of the message, and distributed scheduling calculations can be performed on the distributed data execution plan to obtain distributed calculation results. In this way, all the data analysis services submitted at one time can be automatically executed without the need to submit data analysis services separately, without manual intervention by data analysts, reducing business complexity, thereby improving data analysis efficiency and reducing data analysis service execution errors.

BRIEF DESCRIPTION OF THE DRAWINGS

In order to explain the technical solutions of the embodiments of the present disclosure more clearly, the following will briefly introduce the drawings that need to be used in the embodiments. It should be understood that the following drawings only show some embodiments of the present disclosure, and therefore should not be regarded as limiting the scope. Those of ordinary skill in the art can obtain other related drawings according to these drawings without creative work.

DETAILED DESCRIPTION OF THE EMBODIMENTS

In order to make the purpose, technical solutions, and advantages of the embodiments of the present disclosure clearer, the technical solutions in the embodiments of the present application will be described clearly and completely in conjunction with the drawings in the embodiments of the present disclosure. It should be understood that the drawings in the present disclosure are only for the purpose of illustration and description, and are not intended to limit the scope of the present disclosure. In addition, it should be understood that the schematic drawings are not drawn to scale. The flowchart used in the present disclosure shows operations implemented according to some embodiments of the present disclosure. It should be understood that the operations of the flowchart may be implemented out of order, and operations without logical context may be reversed in order or implemented at the same time. In addition, under the guidance of the content of the present disclosure, those skilled in the art can add one or more other operations to the flowchart, or remove one or more operations from the flowchart.

Figure 1:
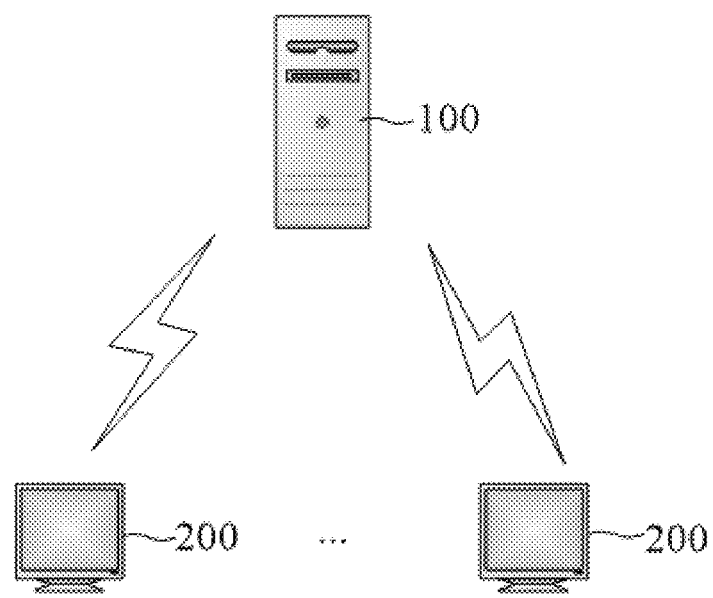
FIG. 1 shows a schematic diagram of an application scenario of a distributed data processing system according to an embodiment of the present disclosure.

FIG. 1 shows a schematic diagram of an application scenario of a distributed data processing system 10 according to an embodiment of the present disclosure. In this embodiment, the distributed data processing system 10 may include a server 100 and a user terminal 200 communicating with the server 100.

The user terminal 200 may include, but is not limited to, a smart phone, a tablet computer, a laptop computer, a personal computer, a workstation, etc., which is not limited in detail herein.

In a possible implementation manner, the server 100 may be a single server or a server group. The server group may be centralized or distributed (for example, the server 100 may be a distributed system).

It can be understood that in other possible implementation manners, the distributed data processing system 10 may also include only a part of the components shown in FIG. 1 or may also include other components.

Figure 2:
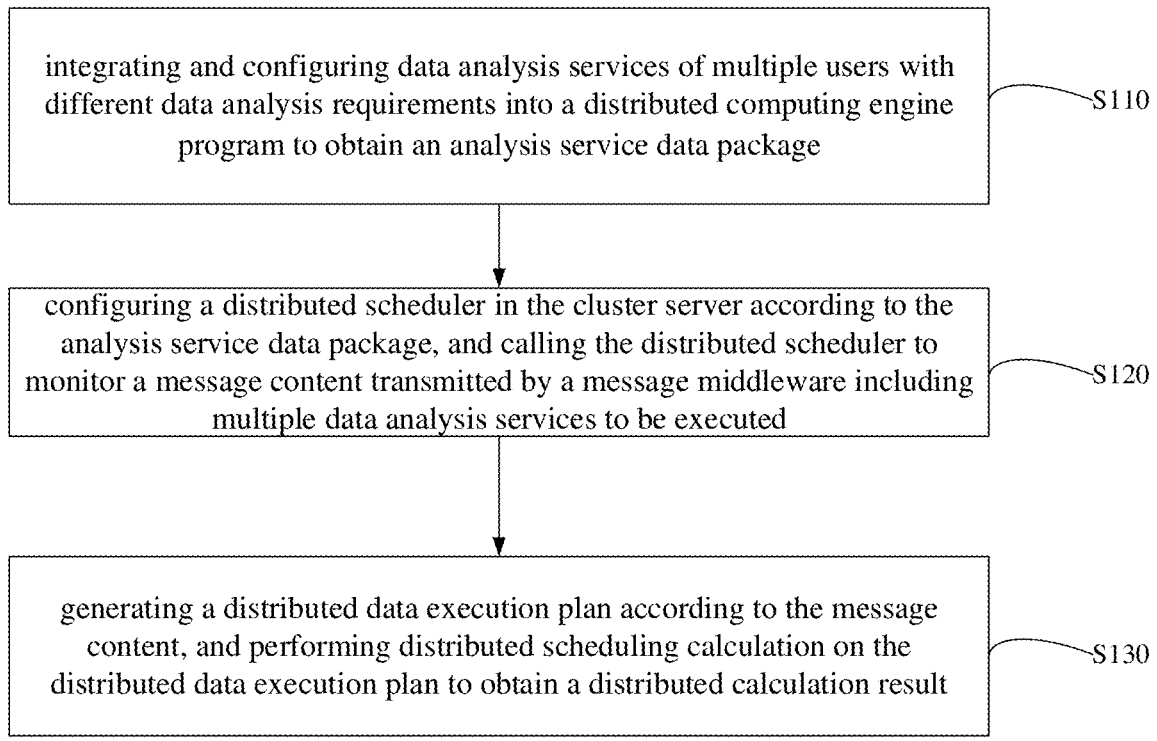
FIG. 2 shows a schematic flowchart of a distributed data processing method according to an embodiment of the present disclosure.

FIG. 2 shows a schematic flowchart of a method for processing distributed data according to an embodiment of the present disclosure. In this embodiment, the method for processing the distributed data may be executed by the server 100 shown in FIG. 1. It should be understood that, in other embodiments, the order of some of the operations of the method for processing the distributed data may be exchanged according to actual needs, or some of the operations may also be omitted or deleted. The detailed operations of the method for processing the distributed data are introduced as follows.

Operation S110, integrating and configuring data analysis services of multiple users with different data analysis requirements into a distributed computing engine program to obtain an analysis service data package.

Operation S120, configuring a distributed scheduler in the cluster server according to the analysis service data package, and calling the distributed scheduler to monitor a message content transmitted by a message middleware including multiple data analysis services to be executed.

Operation S130, generating a distributed data execution plan according to the message content, and performing distributed scheduling calculation on the distributed data execution plan to obtain a distributed calculation result.

The distributed computing engine program can be a Spark computing engine program. Different data analysis services can be distinguished by different class files in the analysis service data package. Class files are also called Java class files, which can provide Java programs with services in binary form independent of the underlying platform.

The inventors of the present disclosure found that in traditional data analysis solutions, for different companies, some data analysis services usually exist independently. For example, a data analysis service may correspond to a set of hive scripts, or a data analysis service may correspond to a set of java programs, Spark programs, or the like. However, if there are associated calculations and other operations between these data analysis services, data analysis service personnel need to manually perform a large number of associated operations. With the expansion of business scale, there are more and more scattered data analysis services, which will become more and more difficult for subsequent maintenance and upgrades.

In response to the above problems, in this embodiment, data analysis services of multiple users with different data analysis requirements are developed and modified, so as to be integrated and configured into the distributed computing engine program to obtain the analysis service data package. For example, each data analysis service can be developed or modified in the form of Spark, so that the analysis service data package in the Spark calculation engine program can be obtained. The analysis service data package can be configured in the Spark computing engine program in the form of a jar package.

Thus, the distributed scheduler can be configured in the cluster server according to the analysis service data package, so that the distributed scheduler can be called to monitor the message content transmitted by the message middleware including multiple data analysis services to be executed. For example, data analysts can submit all data analysis services at one time and transmit them to the distributed scheduler through message middleware (such as kafka message middleware, or the like.). As a result, a distributed data execution plan can be generated according to the message content, and distributed scheduling calculations can be performed on the distributed data execution plan to obtain distributed calculation results.

Based on any of the above operations, in this embodiment, the data analysis services of multiple users with different data analysis requirements are integrated and configured into the distributed computing engine program, the distributed scheduler in the cluster server is configured according to the analysis service data package, and the distributed scheduler is called to monitor the message content transmitted by the message middleware including multiple data analysis services to be executed. As a result, a distributed data execution plan can be generated according to the content of the message, and distributed scheduling calculations can be performed on the distributed data execution plan to obtain distributed calculation results. In this way, all the data analysis services submitted at one time can be automatically executed without the need to submit data analysis services separately, without manual intervention by data analysts, reducing business complexity, thereby improving data analysis efficiency and reducing data analysis service execution errors.

In a possible implementation manner, for operation S110, it can be further implemented by the following sub-operation S111 and sub-operation S112, which are exemplarily described as follows.

Sub-operation S111, defining each data analysis service as an interface service in the distributed computing engine, configuring a calculation logic corresponding to each interface service, and configuring a matrix data table returned by the calculation result of each interface service.

Sub-operation S112, integrating and configuring each interface service according to each matrix data table to obtain the analysis service data package through the distributed computing engine.

In this embodiment, through the distributed computing engine, each interface service is integrated and configured according to each matrix data table, to obtain the analysis service data package. As such, subsequent data analysis does not need to submit data analysis services separately, and all data analysis services submitted at one time can be automatically executed based on a unified analysis service data package. Therefore, there is no need for data analysts to manually intervene in the associated calculation operations before different data analysis services, which improves the execution efficiency of data analysis services.

In a possible implementation manner, for operation S130, it can be further implemented by the following sub-operation S131 to sub-operation S134, which are exemplarily described as follows.

Sub-operation S131, when monitoring the message content transmitted by the message middleware, storing the message content and a transmission timestamp corresponding to the message content in a preset database, and setting an execution state of the message content to an unexecuted state.

For example, when the message content A transmitted in the message middleware kafka is monitored, the message content A and the transmission timestamp XX.XX.XX of the message content A are saved to the Mysql database. At the same time, set the execution status of the message content A to 0 (0: unexecuted state, −1: executing state, 1: executed state).

Sub-operation S132, scanning the preset database every preset time interval, when it is found that there is a message content whose execution status is not executed in the preset database, and there is no execution program whose execution status is executing, sorting each message content in order of the transmission timestamp of the message content whose execution status is not executed, and generating a message content sorting list.

For example, the above Mysql database can be scanned every 1 minute. If it is found that there is a message content A with an execution status of 0, and there is no execution program with an execution status of −1, the scheduling of the data analysis service for the message content A will be initiated and the status of the message content A is modified to −1. If there are multiple message contents, the message contents with the smallest transmission timestamp can be obtained according to the order of the transmission timestamps of the message contents, so as to start the scheduling of the data analysis service.

Sub-operation S133, respectively generating a distributed data execution plan for each message content according to the order of each message content in the message content sorting list.

For example, assuming that the order of the message content sorting list is message content 1, message content 2, message content 3, and message content 4, then the distributed data execution plans of message content 1, message content 2, message content 3, and message content 4 can be generated according to message content 1, message content 2, message content 3, and message content 4, respectively.

Sub-operation S134, when execution of the distributed data execution plan corresponding to any message content is completed, setting the execution state of the message content to the executed state.

For example, taking the above example as an example, when the distributed data execution plan corresponding to message content 1 is executed, the execution status corresponding to message content 1 in the Mysql database can be modified to 1, and then wait for the distributed data execution plan corresponding to message content 1 to be executed.

In a possible implementation manner, operation S130 is still targeted, during the process of performing distributed scheduling calculation on the distributed data execution plan to obtain the distributed calculation result, it can be further implemented through the following sub-operation S135 to sub-operation S138, which is exemplarily described as follows.

Sub-operation S135, parsing plan information of the distributed data execution plan.

For example, the plan information may include the data analysis service list service_list, the analysis service type service_type, and the task plan identifier task_id corresponding to each data analysis service service_name in the data analysis service_list service_list.

Sub-operation S136, starting a first thread and a second thread according to the plan information.

For example, the first thread may be configured to start a target distributed computing engine program corresponding to the analysis service type, and obtain a return status code of the target distributed computing engine program, and the second thread may be configured to obtain log information of the target distributed computing engine program.

The return status code can refer to the status code returned by the target distributed computing engine program after it is started, and can be specifically used to indicate whether the target distributed computing engine program is started successfully, and the status during the startup process. In addition, the log information of the target distributed computing engine program can be used to indicate the state behavior of the target distributed computing engine program during the startup process, such as error state behavior.

Sub-operation S137, transmitting the data analysis service list into the target distributed computing engine program after starting the target distributed computing engine program corresponding to the analysis service type.

Sub-operation S138, loading data to be calculated corresponding to the task plan identifier from a predefined data source table, executing the data analysis service of the transmitted data analysis service list through the target distributed computing engine program, and performing the distributed scheduling calculation on the data to be calculated to obtain the distributed computing result.

For example, in a possible implementation, if service_type=recall, that is, when the analysis service type is the retrospective analysis service type, the source data of the task plan ID=task_id is loaded from the defined data source table, and the service list is transmitted into the backtracking target distributed computing engine program. For another example, if service_type=cache, that is, when the analysis service type is the collision cache service type, the source data of task number=task_id is loaded from the defined data source table, and the service_list is transmitted into the target distributed computing engine program of the collision cache. For another example, if service_type=script, that is, when the analysis service type is the script scoring service type, the source data of task number=task_id is loaded from the defined data source table, and the service_list is transmitted into the target distributed computing engine program for the script scoring.

During the above process, the first thread and the second thread can be started. The first thread is used to start the target distributed computing engine program for backtracking, or the target distributed computing engine program of the collision cache, or the target distributed computing engine program for the script scoring, and obtain the return status code of the target distributed computing engine program for backtracking, or the target distributed computing engine program of the collision cache, or the return status code of the target distributed computing engine program for the script scoring. The second thread is used to obtain the log information of the target distributed computing engine program for backtracking, or the target distributed computing engine program of the collision cache, or the target distributed computing engine program for the script scoring.

Further, in a possible implementation, when the analysis service type is a retrospective analysis service type, searching whether there are target data analysis services that depend on other data analysis services in the data analysis service list through the target distributed computing engine program. The other data analysis services do not exist in the data analysis service list.

When there are target data analysis services that depend on other data analysis services in the data analysis service list, adding the other data analysis services to the data analysis service list; and sorting the data analysis service list according to order of each message content in the pre-defined message content sorting list, and executing each data analysis service in the data analysis service list according to the sorting result, respectively scheduling the data to be calculated corresponding to each data analysis service to each computing node in the distributed computing cluster to execute the corresponding distributed computing task, to obtain the distributed computing result.

For example, when data analysis service A depends on data analysis service B in the data analysis service list, and data analysis service B is not included in the data analysis service list, data analysis service B will be added to the data analysis service list. When the data analysis service list is added, the data analysis service list will be sorted according to the pre-defined priority, and the execution plan will be finally determined. For example: which data analysis services are executed, the order in which each data analysis service is executed, and whether the execution results of each data analysis service are retained and output. As a result, each data analysis service that needs to be executed can be executed in the order of priority. For example, after the data to be calculated corresponding to the task plan identifier loaded from the predefined data source table is subjected to distributed calculation, the calculation result (which may include task_id, service_name) is output to the specified data table.

For another example, when the analysis service type is a cache collision service type, traversing each data analysis service that needs to be cached in the data analysis service list through the target distributed computing engine program; and obtaining, according to the data analysis service, from a pre-defined cache table, collision cache data that belongs to the data analysis service and is associated and matched with the data to be calculated, using the collision cache data corresponding to all data analysis services as the distributed calculation result.

For still another example, when the analysis service type is a script scoring service type, obtaining a scoring script corresponding to each data analysis service in the data analysis service list and all external files that the scoring script depends on through the target distributed computing engine program; and traversing the data to be calculated, calling the scoring script and all external files that the scoring script depends on to calculate the data to be calculated, to obtain the distributed calculation result. All external files that the scoring script depends on may refer to basic data files that the scoring script needs to call during the scoring process.

Figure 3:
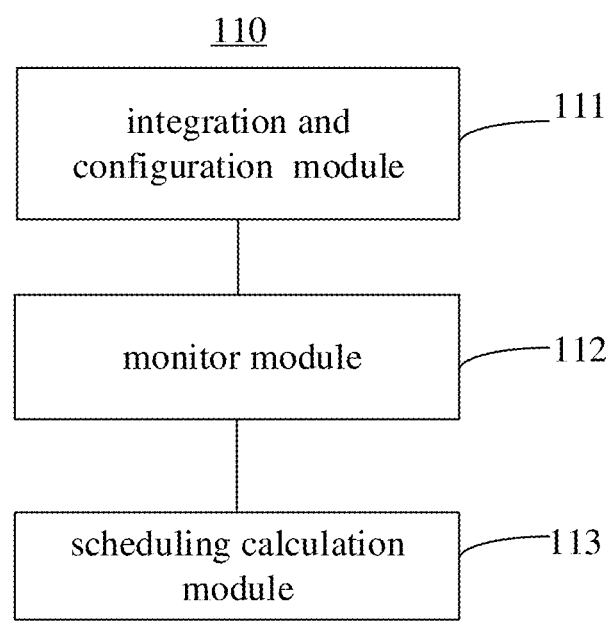
FIG. 3 shows a schematic diagram of functional modules of a distributed data processing device according to an embodiment of the present disclosure.

Based on the same inventive concept, please refer to FIG. 3, which shows a schematic diagram of functional modules of a distributed data processing device 110 according to an embodiment of the present disclosure. In this embodiment, the distributed data processing device 110 can be divided into functional modules according to the foregoing method embodiment. For example, each function module can be divided according to each function, or two or more functions can be integrated into one processing module. The above-mentioned integrated modules can be implemented in the form of hardware or software functional modules. It should be noted that the division of modules in the embodiments of the present disclosure is illustrative, and is only a logical function division, and there may be other division methods in actual implementation. For example, in the case of dividing each functional module corresponding to each function, the distributed data processing device 110 shown in FIG. 3 is only a schematic diagram of the device. The distributed data processing device 110 may include an integration and configuration module 111, a monitor module 112, and a scheduling calculation module 113. The functions of each functional module of the distributed data processing device 110 are respectively described in detail below.

The integration and configuration module 111 is for integrating and configuring data analysis services of multiple users with different data analysis requirements into a distributed computing engine program to obtain an analysis service data package, wherein different data analysis services are distinguished by different class files in the analysis service data package. It can be understood that the integration and configuration module 111 may be used to perform the above operation S110, and the detailed implementation of the integration and configuration module 111 may refer to the above-mentioned content related to operation S110.

The monitor module 112 is for configuring a distributed scheduler in the cluster server according to the analysis service data package, and calling the distributed scheduler to monitor a message content transmitted by a message middleware including multiple data analysis services to be executed. It can be understood that the monitor module 112 may be used to perform the above operation S120, and the detailed implementation of the monitor module 112 may refer to the above-mentioned content related to operation S120.

The scheduling calculation module 113 is for generating a distributed data execution plan according to the message content, and performing distributed scheduling calculation on the distributed data execution plan to obtain a distributed calculation result. It can be understood that the scheduling calculation module 113 may be used to perform the above operation S130, and the detailed implementation of the scheduling calculation module 113 may refer to the above-mentioned content related to operation S130.

In a possible implementation manner, the integration and configuration module 111 is specifically used for:

when monitoring the message content transmitted by the message middleware, storing the message content and a transmission timestamp corresponding to the message content in a preset database, and setting an execution state of the message content to an unexecuted state;

scanning the preset database every preset time interval, when it is found that there is a message content whose execution status is not executed in the preset database, and there is no execution program whose execution status is executing, sorting each message content in order of the transmission timestamp of the message content whose execution status is not executed, and generating a message content sorting list;

respectively generating a distributed data execution plan for each message content according to the order of each message content in the message content sorting list; and when execution of the distributed data execution plan corresponding to any message content is completed, setting the execution state of the message content to the executed state.

In a possible implementation manner, the scheduling calculation module 113 is specifically used for:

parsing plan information of the distributed data execution plan, the plan information including a data analysis service list, an analysis service type, and a task plan identifier corresponding to each data analysis service in the data analysis service list;

starting a first thread and a second thread according to the plan information, the first thread being for starting a target distributed computing engine program corresponding to the analysis service type, and obtaining a return status code of the target distributed computing engine program, the second thread being for obtaining log information of the target distributed computing engine program;

transmitting the data analysis service list into the target distributed computing engine program after starting the target distributed computing engine program corresponding to the analysis service type; and loading data to be calculated corresponding to the task plan identifier from a predefined data source table, executing the data analysis service of the transmitted data analysis service list through the target distributed computing engine program, and performing the distributed scheduling calculation on the data to be calculated to obtain the distributed computing result.

In a possible implementation manner, the scheduling calculation module 113 is specifically used for:

when the analysis service type is a retrospective analysis service type, searching whether there are target data analysis services that depend on other data analysis services in the data analysis service list through the target distributed computing engine program, wherein the other data analysis services do not exist in the data analysis service list;

when there are target data analysis services that depend on other data analysis services in the data analysis service list, adding the other data analysis services to the data analysis service list; and sorting the data analysis service list according to order of each message content in the pre-defined message content sorting list, and executing each data analysis service in the data analysis service list according to the sorting result, respectively scheduling the data to be calculated corresponding to each data analysis service to each computing node in the distributed computing cluster to execute the corresponding distributed computing task, to obtain the distributed computing result.

In a possible implementation manner, the scheduling calculation module 113 is specifically used for:

when the analysis service type is a cache collision service type, traversing each data analysis service that needs to be cached in the data analysis service list through the target distributed computing engine program; and obtaining, according to the data analysis service, from a pre-defined cache table, collision cache data that belongs to the data analysis service and is associated and matched with the data to be calculated, using the collision cache data corresponding to all data analysis services as the distributed calculation result.

In a possible implementation manner, the scheduling calculation module 113 is specifically used for:

when the analysis service type is a script scoring service type, obtaining a scoring script corresponding to each data analysis service in the data analysis service list and all external files that the scoring script depends on through the target distributed computing engine program; and traversing the data to be calculated, calling the scoring script and all external files that the scoring script depends on to calculate the data to be calculated, to obtain the distributed calculation result.

Figure 4:
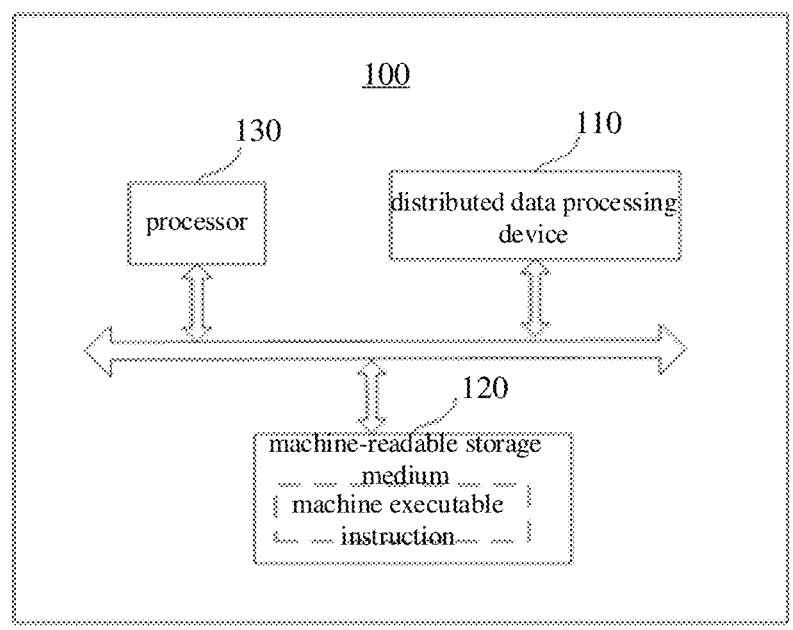
FIG. 4 shows a schematic structural diagram of components of a server for executing the above-mentioned distributed data processing method according to an embodiment of the present disclosure.

Based on the same inventive concept, please refer to FIG. 4, which shows a structural schematic block diagram of a server 100 for executing the foregoing distributed data processing method according to an embodiment of the present disclosure. The server 100 may include a distributed data processing device 110, a machine-readable storage medium 120, and a processor 130.

In this embodiment, the machine-readable storage medium 120 and the processor 130 are both located in the server 100 and are provided separately. However, it should be understood that the machine-readable storage medium 120 may also be independent of the server 100, and may be accessed by the processor 130 through a bus interface. Alternatively, the machine-readable storage medium 120 may also be integrated into the processor 130, for example, may be a cache and/or a general register.

The distributed data processing device 110 may include software function modules stored in a machine-readable storage medium 120 (for example, the integration and configuration module 111, the monitor module 112, and the scheduling calculation module 113 shown in FIG. 3). When the processor 130 executes the software function module in the distributed data processing device 110, the distributed data processing method provided in the foregoing method embodiment is performed.

Since the server 100 according to the embodiment of the present disclosure is another implementation form of the method embodiment executed by the server 100, and the server 100 can be used to execute the distributed data processing method provided by the foregoing method embodiment, the technical effects that can be obtained can refer to the foregoing method embodiment, which will not be repeated here.

The embodiments described above are only a part of the embodiments of the present disclosure, rather than all the embodiments. The components of the embodiments of the present disclosure generally described and shown in the drawings may be arranged and designed in various different configurations. Therefore, the detailed description of the embodiments of the present disclosure provided in the accompanying drawings is not intended to limit the scope of the present disclosure, but merely represents selected embodiments of the present disclosure. Therefore, the scope of the present disclosure shall be subject to the scope of the claims. In addition, based on the embodiments of the present disclosure, all other embodiments that can be obtained by those skilled in the art without creative work shall fall within the scope of the present disclosure.

What is claimed is:

1. A method for processing distributed data, applied to a cluster server communicating with a distributed computing cluster, comprising the following operations:

integrating and configuring data analysis services of multiple users with different data analysis requirements into a distributed computing engine program to obtain an analysis service data package, wherein different data analysis services are distinguished by different class files in the analysis service data package;

configuring a distributed scheduler in the cluster server according to the analysis service data package, and calling the distributed scheduler to monitor a message content transmitted by a message middleware including multiple data analysis services to be executed; and generating a distributed data execution plan according to the message content, and performing distributed scheduling calculation on the distributed data execution plan to obtain a distributed calculation result;

wherein the operation of performing distributed scheduling calculation on the distributed data execution plan to obtain a distributed calculation result comprises:

parsing plan information of the distributed data execution plan, the plan information including a data analysis service list, an analysis service type, and a task plan identifier corresponding to each data analysis service in the data analysis service list;

starting a first thread and a second thread according to the plan information, the first thread being for starting a target distributed computing engine program corresponding to the analysis service type, and obtaining a return status code of the target distributed computing engine program, the second thread being for obtaining log information of the target distributed computing engine program;

transmitting the data analysis service list into the target distributed computing engine program after starting the target distributed computing engine program corresponding to the analysis service type; and loading data to be calculated corresponding to the task plan identifier from a predefined data source table, executing the data analysis service of the transmitted data analysis service list through the target distributed computing engine program, and performing the distributed scheduling calculation on the data to be calculated to obtain the distributed computing result; and the operation of executing the data analysis service of the transmitted data analysis service list through the target distributed computing engine program, and performing the distributed scheduling calculation on the data to be calculated to obtain the distributed computing result comprises:

when the analysis service type is a retrospective analysis service type, searching whether there are target data analysis services in the data analysis service list that depend on other data analysis services through the target distributed computing engine program, wherein the other data analysis services do not exist in the data analysis service list;

when there are target data analysis services in the data analysis service list that depend on the other data analysis services, adding the other data analysis services to the data analysis service list; and sorting the data analysis service list according to order of each message content in the pre-defined message content sorting list, and executing each data analysis service in the data analysis service list according to the sorting result, respectively scheduling the data to be calculated corresponding to each data analysis service to each computing node in the distributed computing cluster to execute the corresponding distributed computing task, to obtain the distributed computing result.

2. The method of claim 1, wherein the operation of integrating and configuring data analysis services of multiple users with different data analysis requirements into a distributed computing engine program to obtain an analysis service data package comprises:

defining each data analysis service as an interface service in the distributed computing engine, configuring a calculation logic corresponding to each interface service, and configuring a matrix data table returned by the calculation result of each interface service; and integrating and configuring each interface service according to each matrix data table to obtain the analysis service data package through the distributed computing engine.

3. The method of claim 1, wherein the operation of generating a distributed data execution plan according to the message content comprises:

when monitoring the message content transmitted by the message middleware, storing the message content and a transmission timestamp corresponding to the message content in a preset database, and setting an execution state of the message content to an unexecuted state;

scanning the preset database every preset time interval, when it is found that there is a message content whose execution status is not executed in the preset database, and there is no execution program whose execution status is executing, sorting each message content in order of the transmission timestamp of the message content whose execution status is not executed, and generating a message content sorting list;

respectively generating a distributed data execution plan for each message content according to the order of each message content in the message content sorting list; and when execution of the distributed data execution plan corresponding to any message content is completed, setting the execution state of the message content to show the message content is executed.

4. The method of claim 1, wherein the operation of executing the data analysis service of the transmitted data analysis service list through the target distributed computing engine program, and performing the distributed scheduling calculation on the data to be calculated to obtain the distributed computing result comprises:

when the analysis service type is a cache collision service type, traversing each data analysis service that needs to be cached in the data analysis service list through the target distributed computing engine program; and obtaining, according to the data analysis service, from a pre-defined cache table, collision cache data that belong to the data analysis service and are associated and matched with the data to be calculated, using the collision cache data corresponding to all data analysis services as the distributed calculation result.

5. The method of claim 1, wherein the operation of executing the data analysis service of the transmitted data analysis service list through the target distributed computing engine program, and performing the distributed scheduling calculation on the data to be calculated to obtain the distributed computing result comprises:

when the analysis service type is a script scoring service type, obtaining a scoring script corresponding to each data analysis service in the data analysis service list and all external files that the scoring script depends on through the target distributed computing engine program; and traversing the data to be calculated, calling the scoring script and all external files that the scoring script depends on to calculate the data to be calculated, to obtain the distributed calculation result.

6. A device for processing distributed data, applied to a duster server communicating with a distributed computing cluster, comprising: software function modules stored in a non-transitory machine-readable storage medium and a processor, wherein when the software function modules are executed by the processor, the method for processing the distributed data of claim 1 is performed.

\* \* \* \* \*